(12) United States Patent
LaFleur et al.

(10) Patent No.: US 11,059,671 B1
(45) Date of Patent: Jul. 13, 2021

(54) CASSETTE STOPPING MECHANISM

(71) Applicant: Toyota Motor Engineering & Manufacturing North America, Inc., Plano, TX (US)

(72) Inventors: Jeffery M. LaFleur, Embro (CA); Dale C. Kitchen, Paris (CA); Julian M. Penton, Innerkip (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/825,080

(22) Filed: Mar. 20, 2020

(51) Int. Cl.
*B65G 21/10* (2006.01)
*B65G 21/20* (2006.01)

(52) U.S. Cl.
CPC ................ *B65G 21/2045* (2013.01)

(58) Field of Classification Search
None
See application file for complete search history.

(56) References Cited

U.S. PATENT DOCUMENTS

| | | | |
|---|---|---|---|
| 4,944,357 A | 7/1990 | Wible et al. | |
| 5,224,812 A * | 7/1993 | Oslin | A21B 3/07 414/401 |
| 5,676,235 A | 10/1997 | Sam et al. | |
| 6,477,442 B1 * | 11/2002 | Valerino, Sr. | B65G 51/34 414/730 |
| 6,543,983 B1 * | 4/2003 | Felder | B23Q 7/10 414/331.07 |
| 6,775,588 B1 * | 8/2004 | Peck | B65G 1/137 700/214 |
| 7,044,703 B2 | 5/2006 | Fukuda et al. | |
| 7,111,721 B1 * | 9/2006 | Turner | B65G 47/8823 193/35 A |
| 8,420,900 B2 * | 4/2013 | Sartell | A01H 5/10 800/312 |
| 8,820,506 B2 * | 9/2014 | Sejourne | B65G 47/8823 193/35 A |
| 9,420,900 B1 * | 8/2016 | Simpson | B65G 1/08 |

(Continued)

FOREIGN PATENT DOCUMENTS

| CN | 205363264 U | 7/2016 |
|---|---|---|
| CN | 205555241 U | 9/2016 |

(Continued)

*Primary Examiner* — Kavel Singh
(74) *Attorney, Agent, or Firm* — Christopher G. Darrow; Darrow Mustafa PC (57) ABSTRACT

A transport cart includes a frame defining at least one support surface structured to support a cassette positioned on the cart. A first stopping member is coupled to the frame so as to be rotatable to at least a first orientation and a second orientation. The first stopping member is also movable with respect to the frame between a first position and a second position spaced farther apart from the frame than the first position. An anti-rotation element is coupled to the frame and is structured to permit rotation of the first stopping member from the first orientation to the second orientation when the first stopping member is in the first position. The anti-rotation element is also structured to prevent rotation of the first stopping member from the first orientation to the second orientation when the first stopping member is in the second position.

11 Claims, 11 Drawing Sheets

(56) References Cited

U.S. PATENT DOCUMENTS

| | | | |
|---|---|---|---|
| 9,862,435 B2 * | 1/2018 | Scarth | B62D 53/04 |
| 2017/0096148 A1 | 4/2017 | Tomida | |

FOREIGN PATENT DOCUMENTS

| | | |
|---|---|---|
| CN | 106005101 A | 10/2016 |
| CN | 106829360 A | 6/2017 |
| JP | 2017065597 | 4/2017 |
| JP | 2018203047 A | 12/2018 |
| KR | 200249217 | 7/1998 |
| KR | 200353503 | 6/2004 |
| WO | 2018225279 A1 | 12/2018 |

* cited by examiner

FIG. 7

CASSETTE STOPPING MECHANISM

TECHNICAL FIELD

The present invention relates to a wheeled transport cart for a manufacturing environment and, more particularly, to a wheeled transport cart incorporating a mechanism to prevent undesired movement of an item being transported off of the cart.

BACKGROUND

A wheeled transport cart may be used to transport tooling and other items in a factory environment. Items to be transported may be positioned on a cassette which may be rolled onto the cart. During movement of the cart, the position of the cassette may shift on the cart. Stopping members may be mounted on the cart to block the cassette from rolling off the cart during cart movement. The stopping members may be rotatable to a "non-blocking" orientation, allowing the cassette to be rolled off the cart. However, during movement of the cassette on the cart, the cassette may impact the stopping members, causing an undesired rotation of the stopping members and allowing the cassette to roll off the cart prematurely.

SUMMARY

In one aspect of the embodiments described herein, a transport cart includes a frame defining at least one support surface structured to support a cassette positioned on the cart. A first stopping member is coupled to the frame so as to be rotatable to at least a first orientation and a second orientation. The first stopping member is also movable with respect to the frame between a first position and a second position spaced farther apart from the frame than the first position. An anti-rotation element is coupled to the frame and is structured to permit rotation of the first stopping member from the first orientation to the second orientation when the first stopping member is in the first position. The anti-rotation element is also structured to prevent rotation of the first stopping member from the first orientation to the second orientation when the first stopping member is in the second position.

DETAILED DESCRIPTION

Embodiments described herein relate to a transport cart including a frame defining at least one support surface structured to support a cassette positioned on the cart. A first stopping member is coupled to the frame so as to be rotatable to at least a first orientation and a second orientation. The first stopping member is also movable with respect to the frame between a first position and a second position spaced farther apart from the frame than the first position. An anti-rotation element is coupled to the frame and is structured to permit rotation of the first stopping member from the first orientation to the second orientation when the first stopping member is in the first position. The anti-rotation element is also structured to prevent rotation of the first stopping member from the first orientation to the second orientation when the first stopping member is in the second position. When the first stopping member is rotated to the second orientation, the cassette may be easily rolled off the cart. The cart may also include a second stopping member mounted thereon and structured to operate in the same manner as the first stopping member. In addition, the second stopping member may be structured to be rotatable between first and second orientations of the second stopping member by rotation of the first stopping member.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 1:
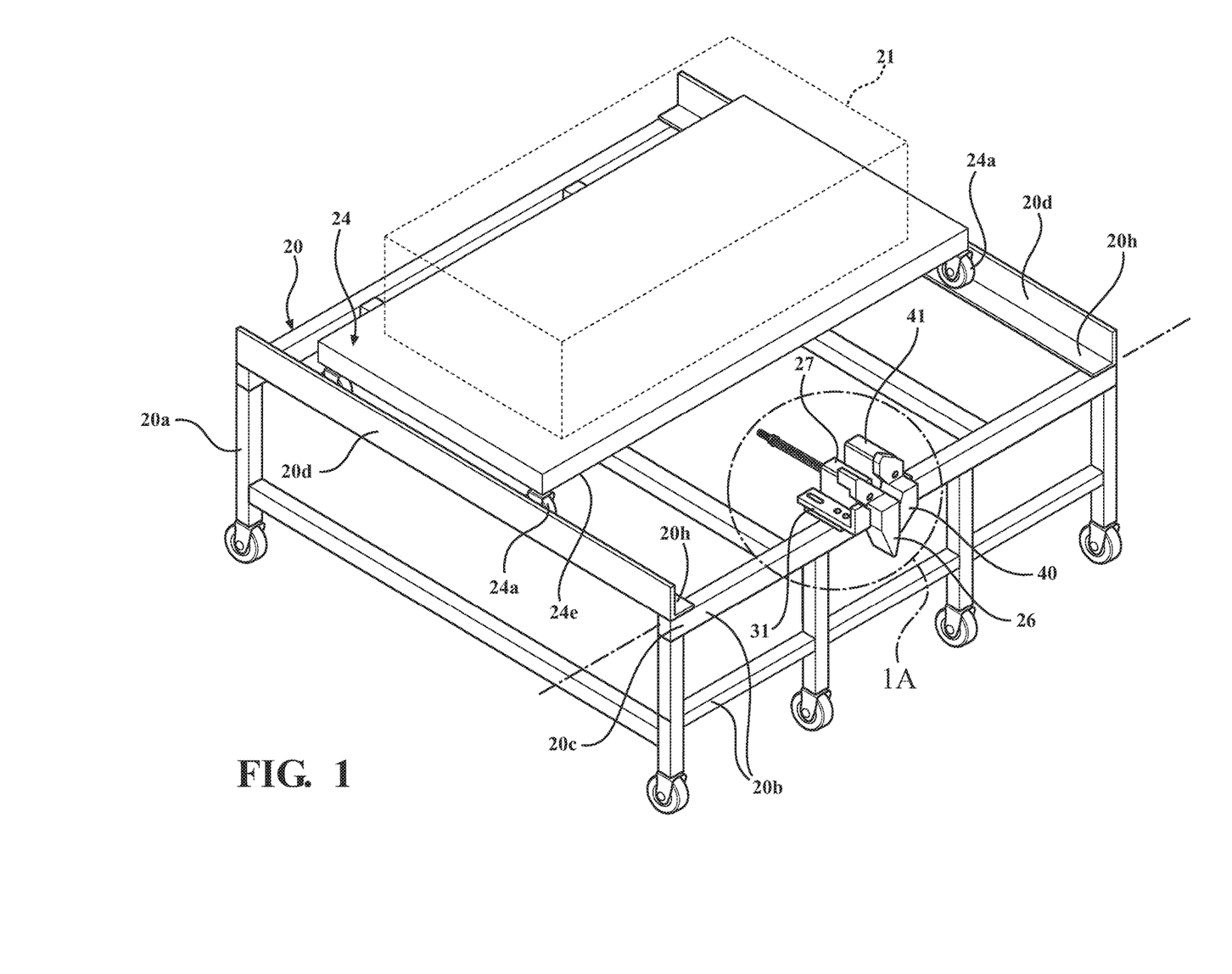
FIG. 1 is a schematic perspective view of a wheeled transport cart in accordance with an embodiment described herein.

FIG. 1 is a schematic perspective view of a wheeled transport cart 20 in accordance with an embodiment described herein. The transport cart 20 may be used to convey tooling 21 and other items between locations in a factory environment. The cart 20 may be manually manipulated and operated or the cart may be part of (or attached to) an AGV (automated guided vehicle) configured to be self-guided to various locations in the plant and/or to autonomously perform one or more loading and/or unloading operations. In one or more arrangements, the transport cart 20 may include a frame 20a formed from a lattice of steel beams or frame members 20b suitably welded or otherwise interconnected to form a support structure for items to be transported. The frame 20a may include steel angles 20d positioned along opposite sides of the frame.

The item(s) to be transported may be positioned on a cassette or tray 24 for transport. The cassette 24 may have rollers 24a positioned along opposite ends of the cassette to enable the cassette to roll along the angles 20d, thereby facilitating loading and unloading of the cassette 24 onto the cart 20 at ends of the angles. Thus, the cassette 24 may be rollable along the angles 20d while the cassette 24 remains loaded onto the cart 20.

The frame 20a may define at least one support surface structured to support the cassette 24 positioned on the cart 20. In the embodiment shown, each angle 24d defines a horizontally-extending support surface 24h along which the cassette rolls on a respective pair of rollers 24a. A cross member 20c of the frame 20a may extend between and below the steel angles 20d. Stopping members 26 and 40 and an anti-rotation element 31 may be mounted to the cross member 20c as described herein.

Figure 1A:
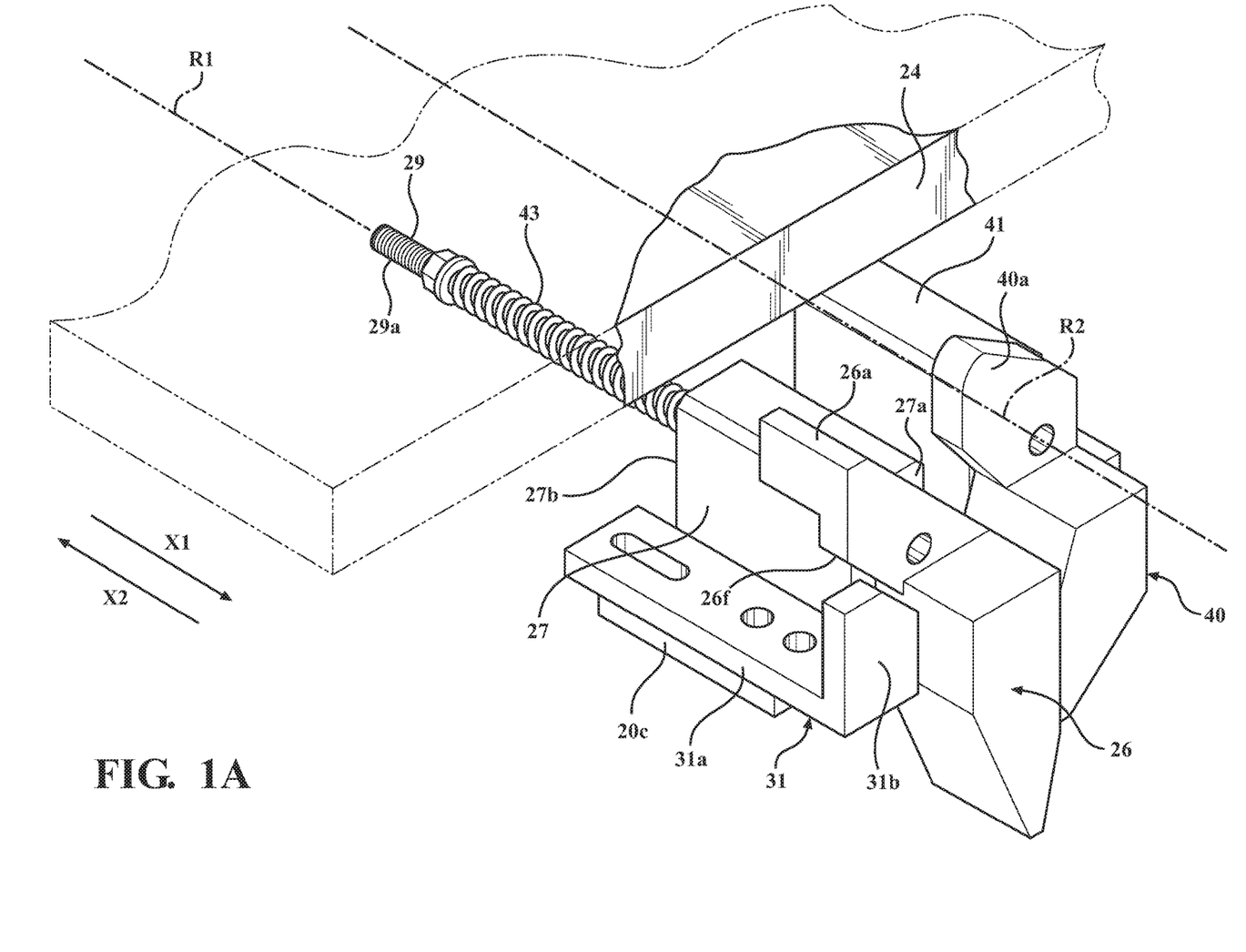
FIG. 1A is a magnified perspective view of a portion of the cart and cassette shown in FIG. 1, with a stopping member of the cart in a first orientation and a first position and prior to contact of the cassette with the stopping member.
Figure 1B:
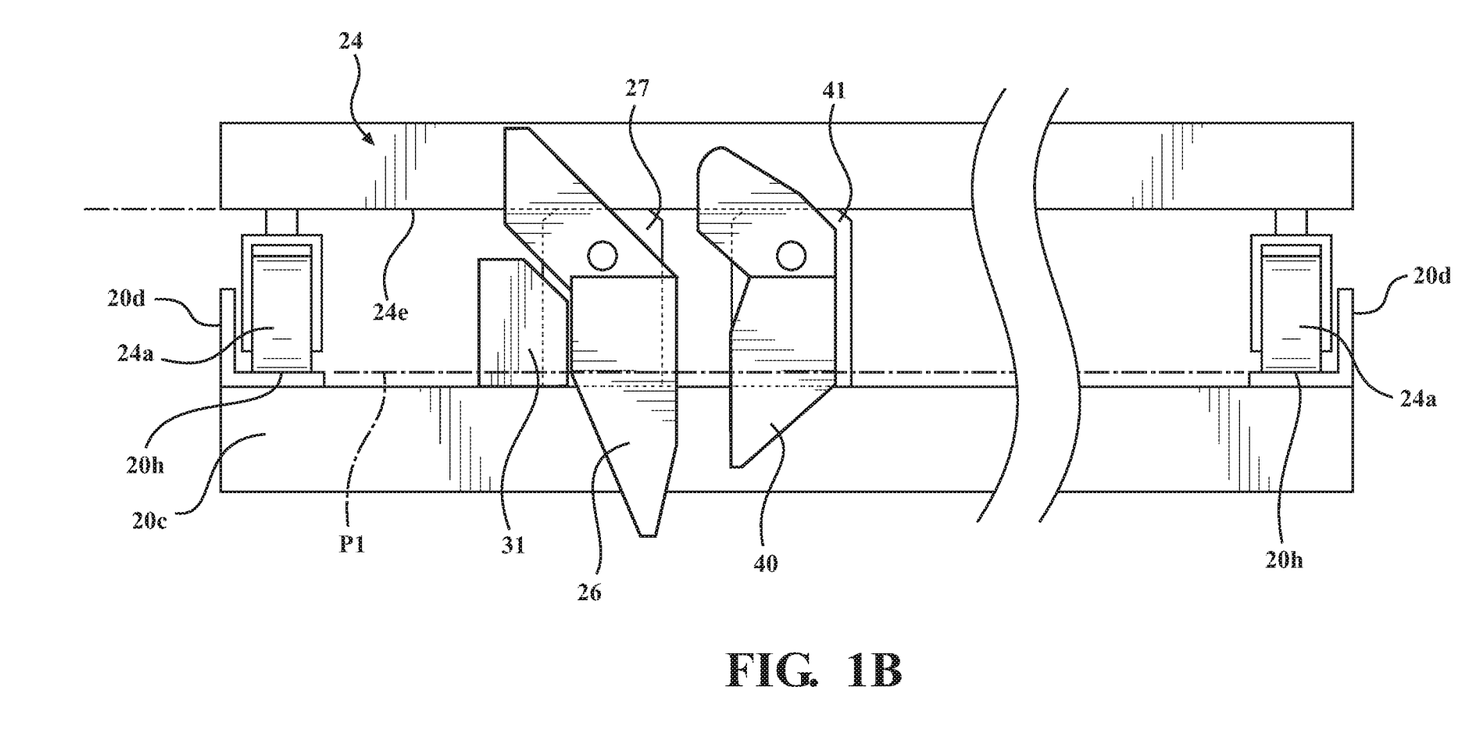
FIG. 1B is an end view of the cart and cassette shown in FIG. 1A.
Figure 2:
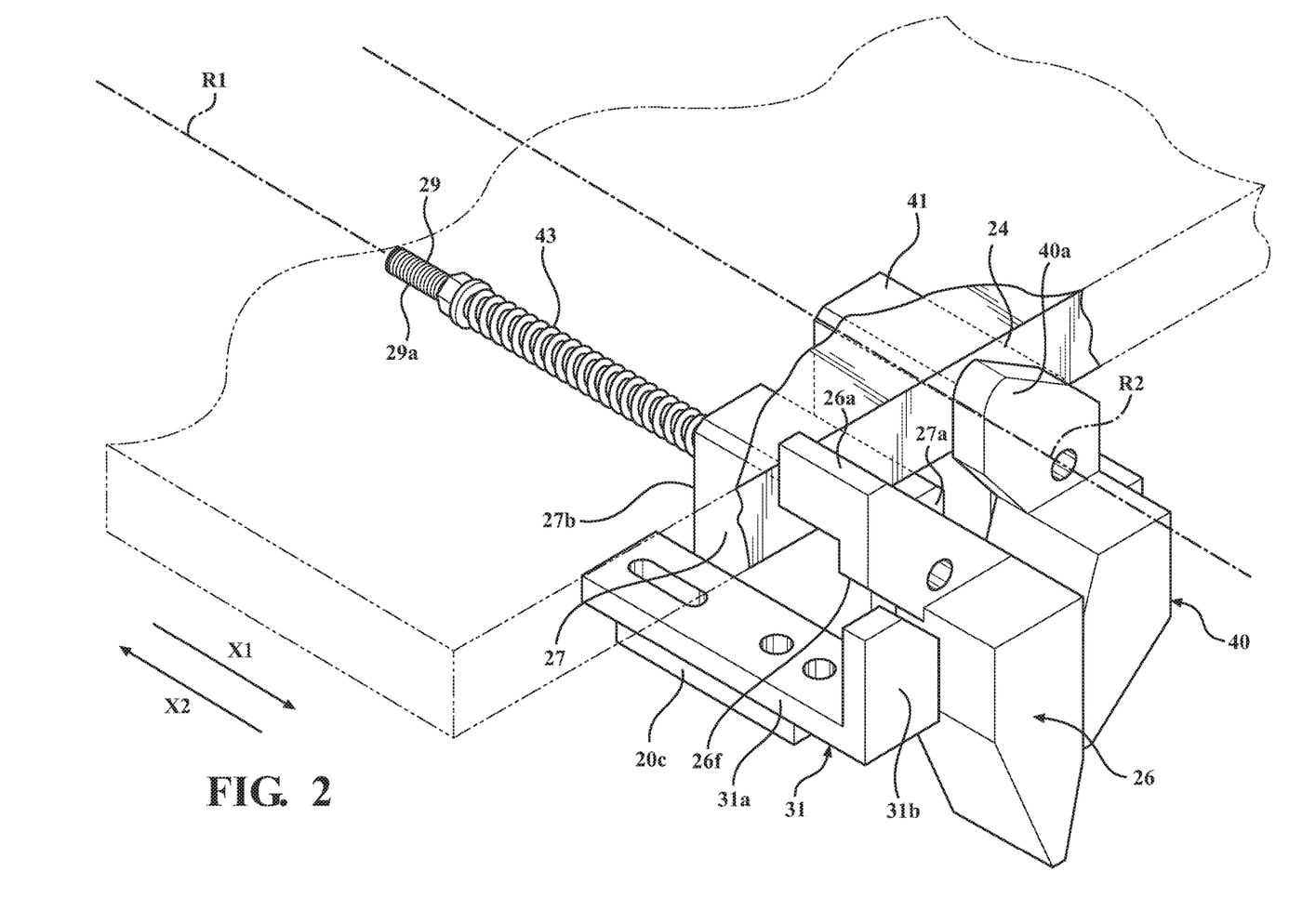
FIG. 2 is the magnified perspective view of FIG. 1A showing impact of a moving cassette on the stopping member.
Figure 3:
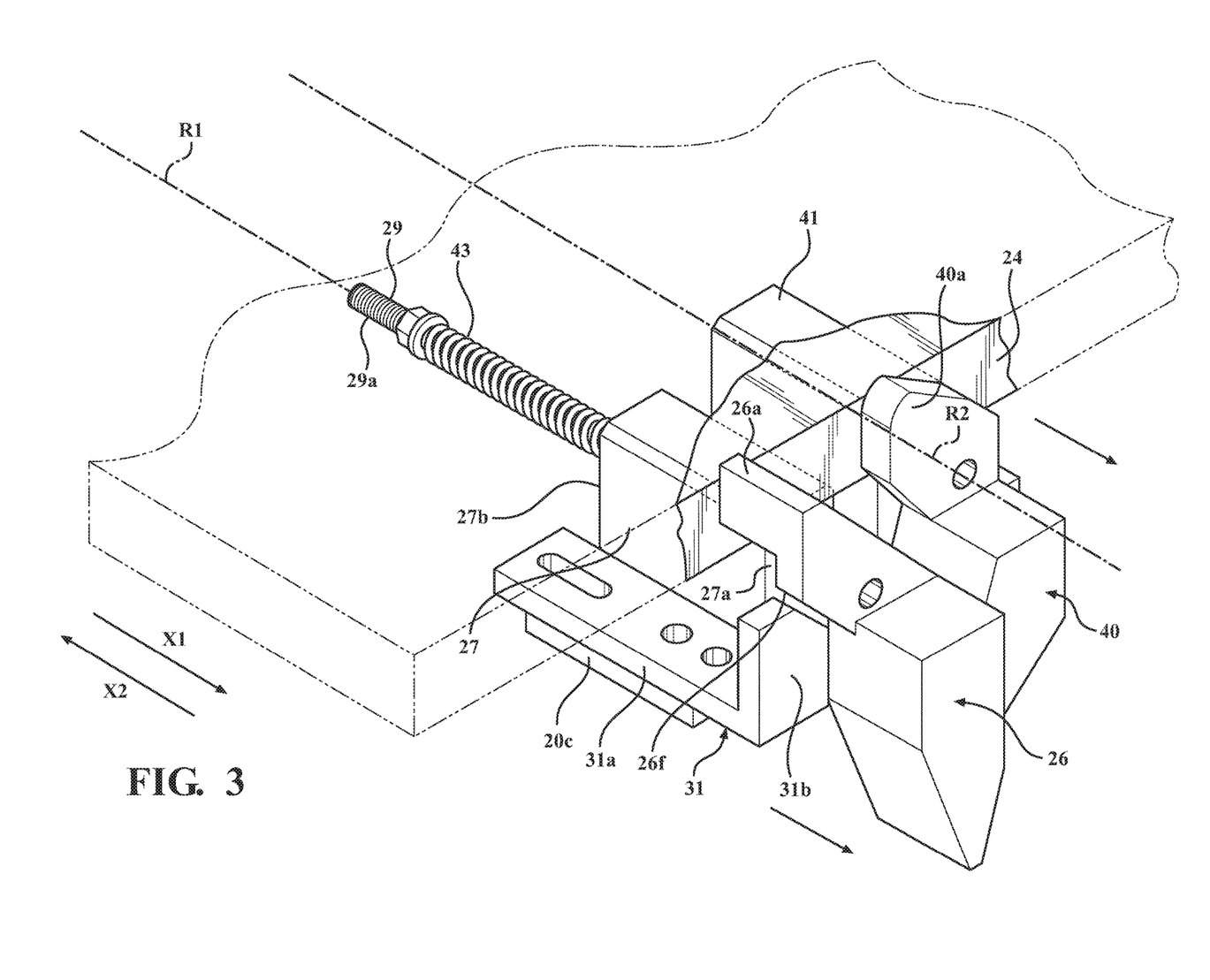
FIG. 3 is the magnified perspective view of FIG. 2 showing movement of the stopping member from the first position to a second position after contact of the cassette with the stopping member.

FIG. 1A is a magnified perspective view of a portion of the cart 20 and cassette 24 shown in FIG. 1. FIG. 1B is an end view of the cart 20 and cassette 24 as shown in FIG. 1. As seen in FIGS. 1A and 1B, a first stopping member 26 may be coupled to the frame 20a along the cross member 20c so as to be rotatable with respect to the cross member 20c to at least a first stopping member first orientation and a first stopping member second orientation. Examples of the first stopping member 26 in the first orientation are shown in FIGS. 1-3. In the first orientation, and as described herein, the first stopping member 26 is structured to be positioned in a path of movement of the cassette 24 in a first direction X1 so as to prevent the cassette 24 from separating from the support surfaces 20h and falling off the cart. Thus, the first stopping member 26 may block movement of the cassette 24 in direction X1 to prevent the cassette rollers 24a from falling off the ends of the angles 20d, thereby rolling off the cart 20.

The first stopping member first and second orientations may be angular or rotational orientations of the first stopping member 26 with respect to a plane P1 defined by (and connecting) support surfaces 20h of angles 20d. In the embodiment shown, the first stopping member 26 is rotatably mounted to a first stopping member mounting block 27 attached to the cross member 20c. The mounting block may have a first side 27a and a second side 27b opposite the first side 27a. Use of the mounting block 27 enables the first stopping member 26 to be mounted at a height that will enable the first stopping member 26 to be rotated to the first stopping member first orientation to stop motion of the cassette 24 off the cart 20, while also enabling the first stopping member 26 to be rotated to the first stopping member second orientation to allow motion of the cassette 24 off the cart 20, as described herein. The mounting block 27 may be structured so that all portions of the mounting block reside below a level of a base 24e of the cassette 24 so that only the first and second stopping members 26, 40 interfere with movement of the cassette 24 onto and off the cart 20.

Figure 6:
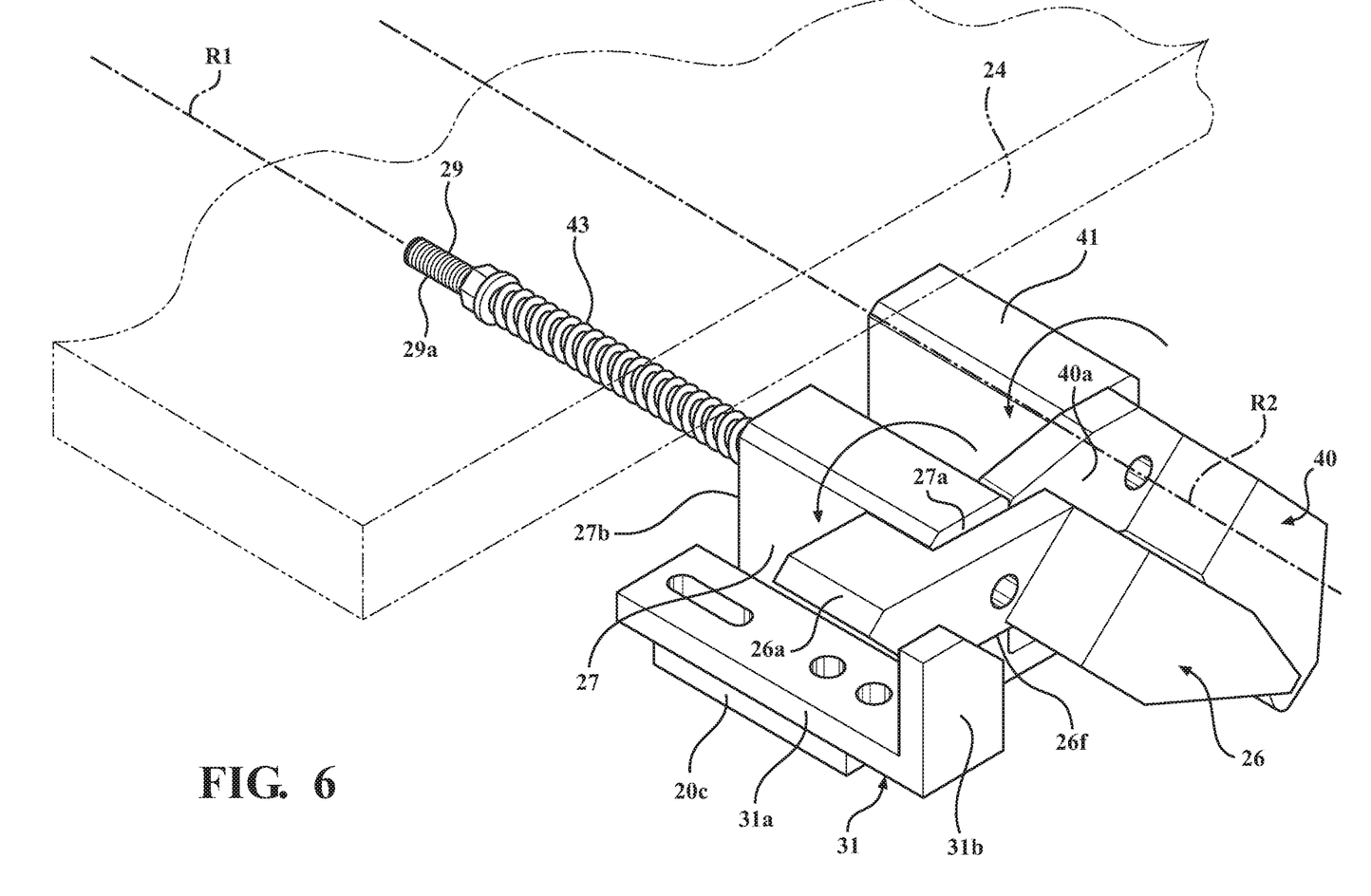
FIG. 6 is the view of FIG. 5 showing rotation of the first and second stopping members from their respective first orientations to their respective second orientations, out of a path of motion of the cassette and while the first and second stopping members are in their first positions.
Figure 6A:
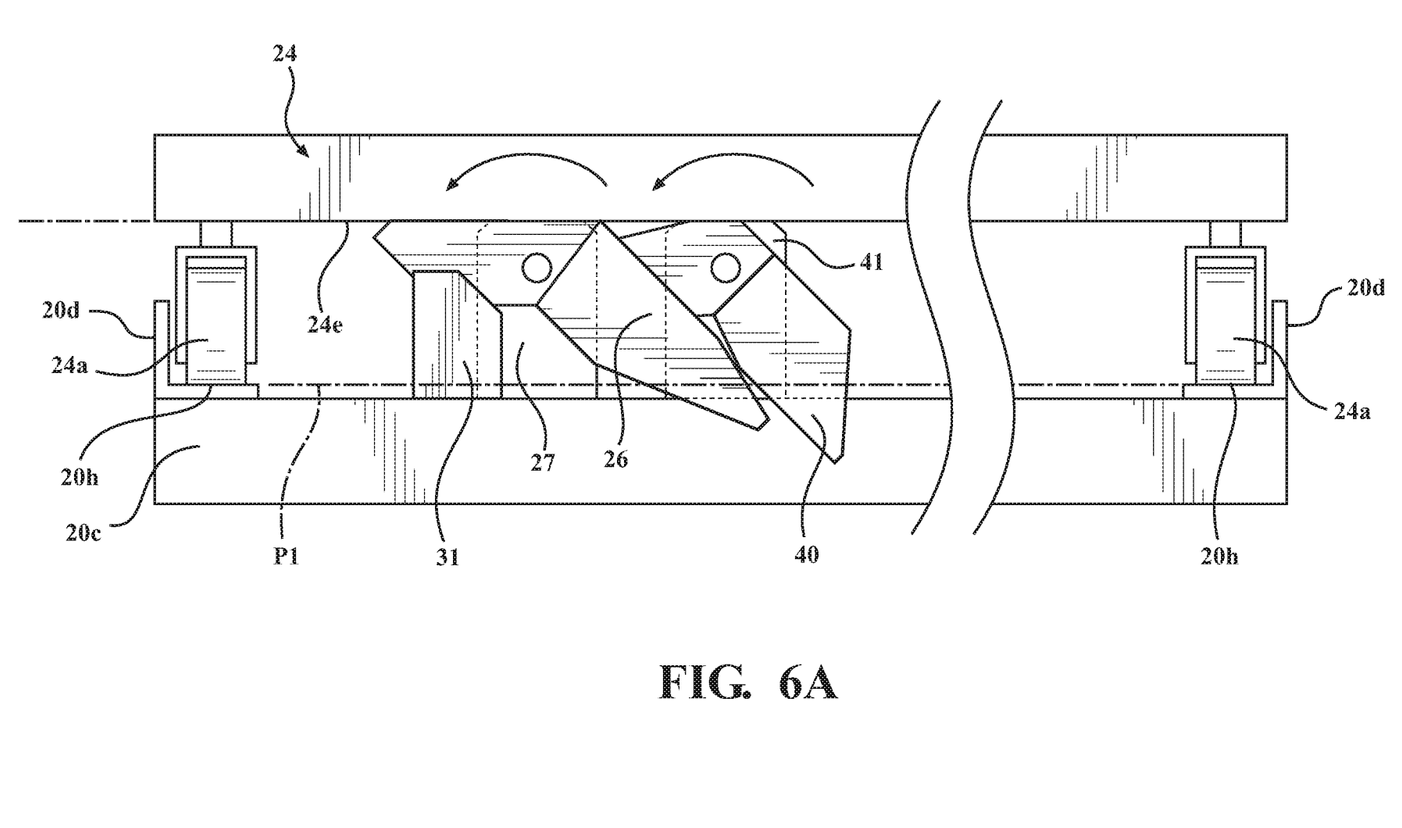
FIG. 6A is an end view of the cart and cassette shown in FIG. 6.
Figure 7:
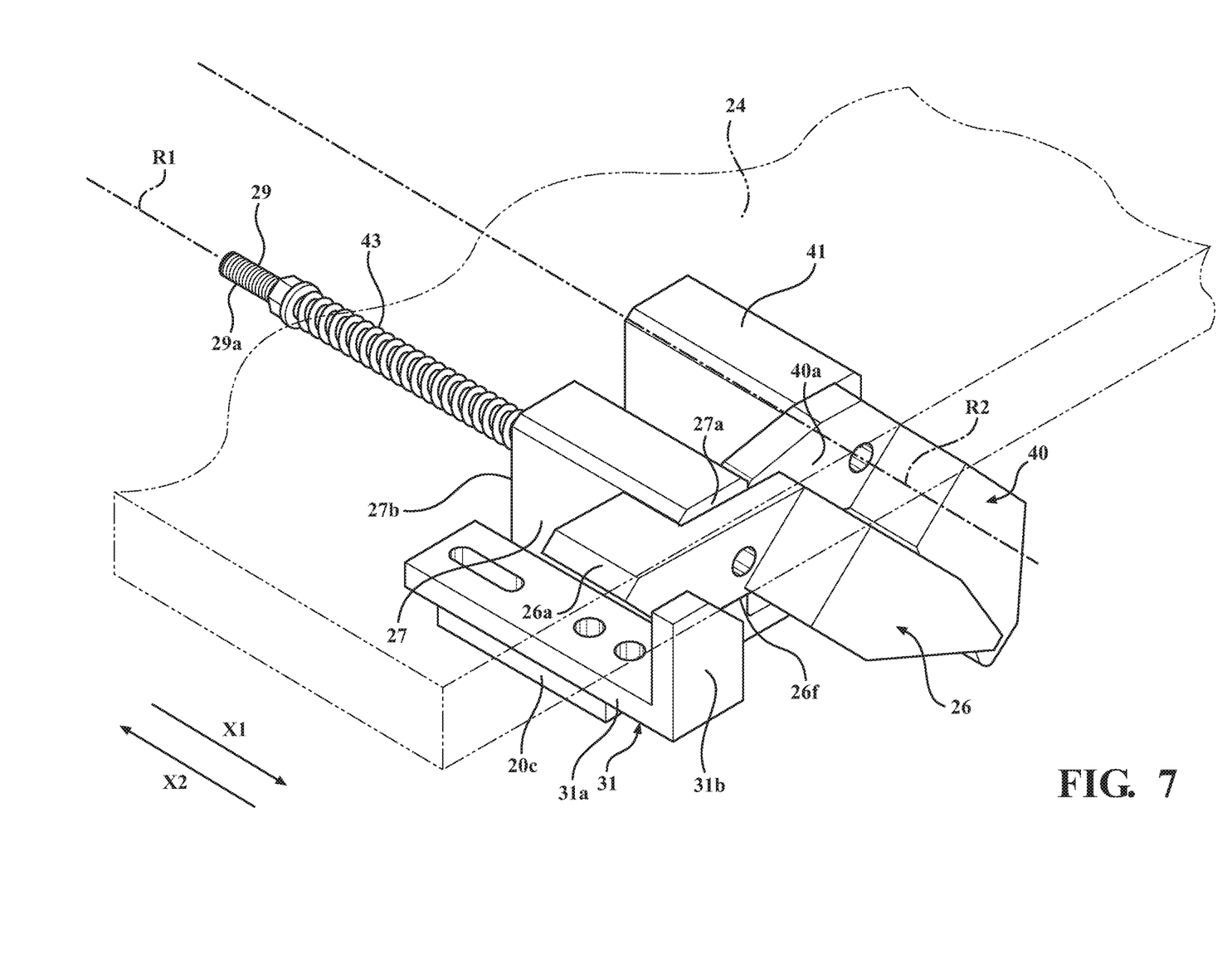
FIG. 7 is the view of FIG. 6A showing the cassette moving past the rotated first and second stopping members and off the cart.

Examples of the first stopping member in the second orientation are shown in FIGS. 6-7. As described herein, the first stopping member 26 may be structured to be positioned out of a path of movement of the cassette in a first direction X1 so as to enable the cassette 24 to separate from the support surfaces 20h when the first stopping member 26 is in the first stopping member second orientation. Thus, when the first stopping member 26 is in the second orientation, the cassette 24 may roll off the cart 20.

Figure 4:
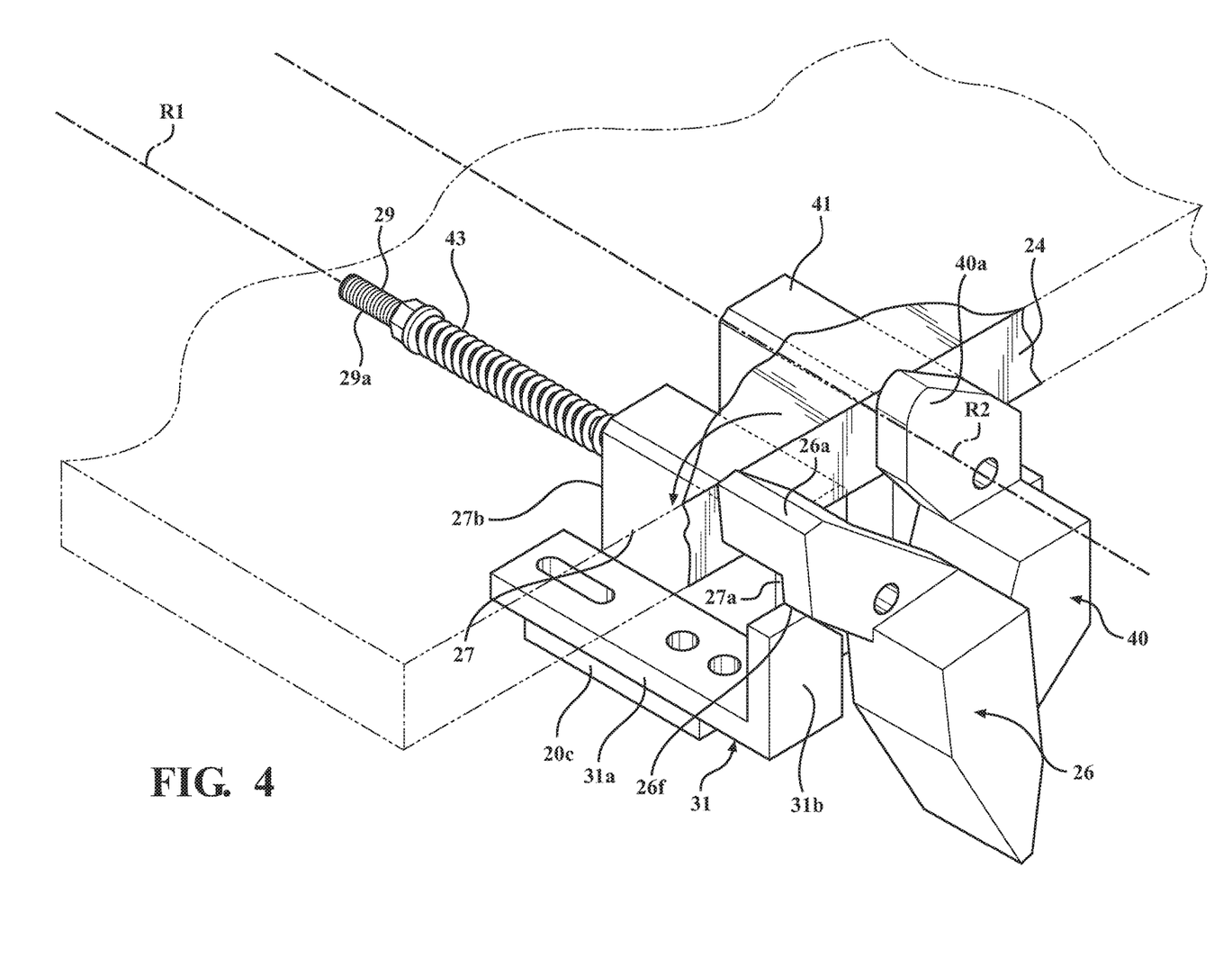
FIG. 4 is the magnified perspective view of FIG. 3 showing an undesired rotation of the stopping member blocked by an anti-rotation element of the cart.
Figure 4A:
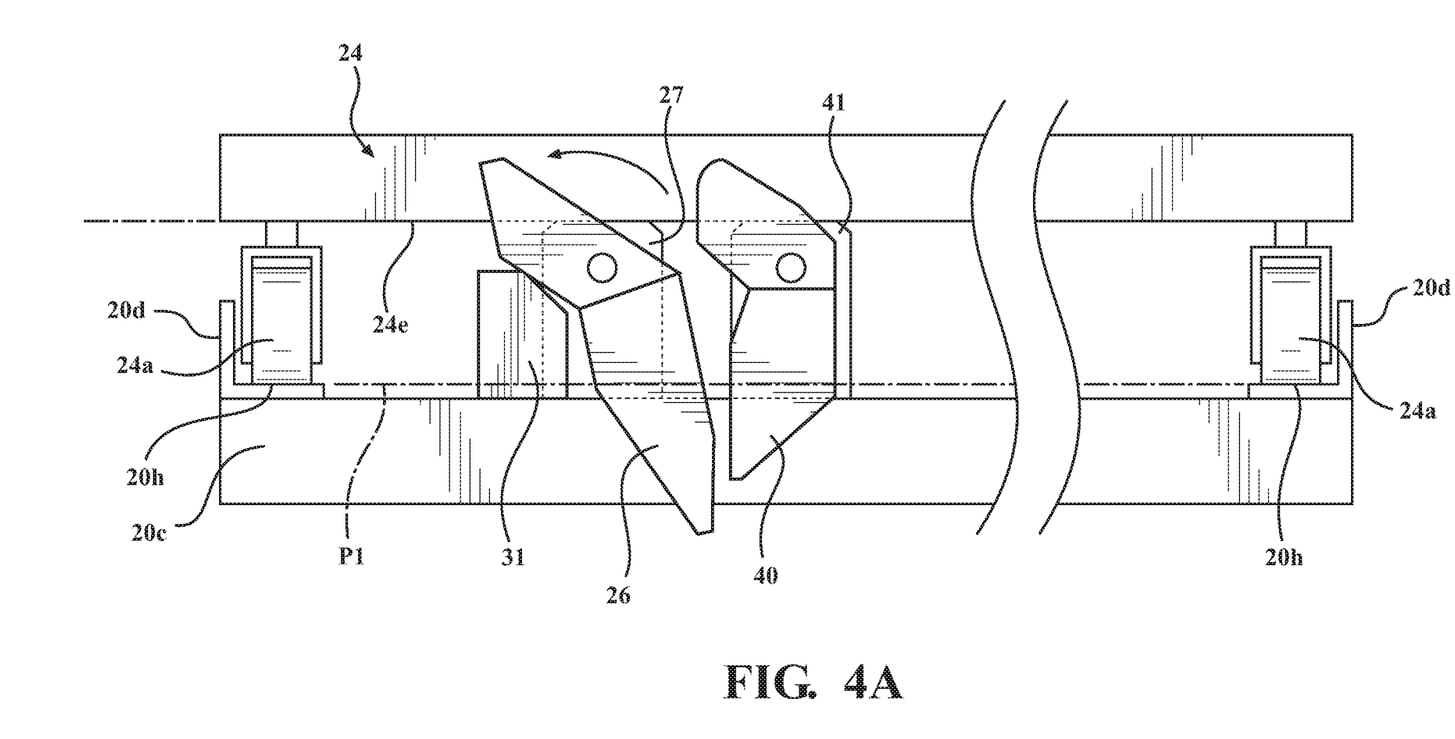
FIG. 4A is an end view of the cart and cassette shown in FIG. 4, showing the undesired rotation of the stopping member blocked by the anti-rotation element.
Figure 5:
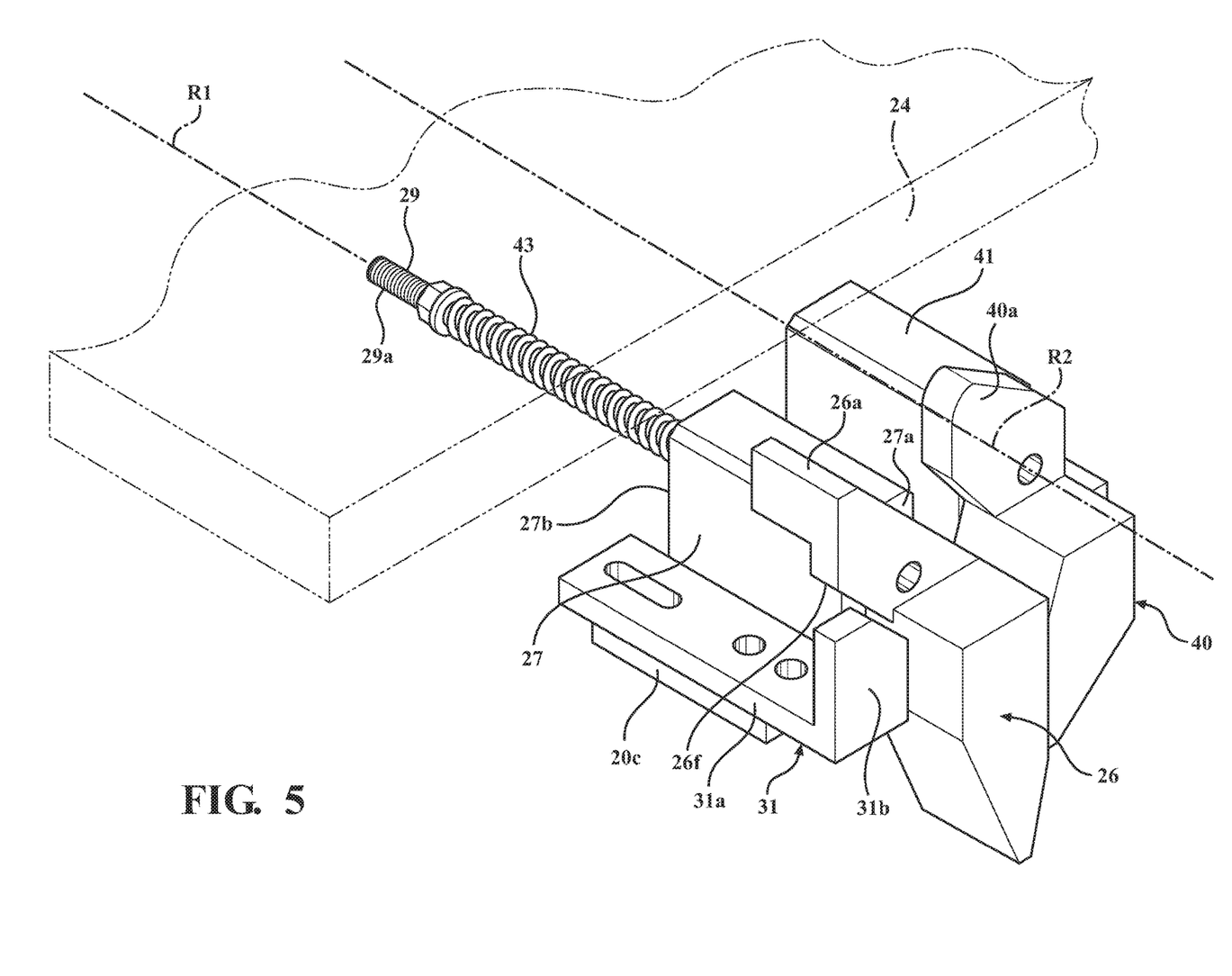
FIG. 5 is a repeat of the view of FIG. 1A, showing first and second stopping members of the cart in their respective first orientations and first positions.

The first stopping member 26 may also be movable with respect to the frame 20a between a first position and a second position spaced farther apart from the frame 20a than the first position. Examples of the first stopping member 26 in the first position are shown in FIGS. 1-2 and 5. The first stopping member 26 may reside in the first position prior to contact of a cassette 24 moving in direction X1 with the first stopping member 26. The cassette 24 may move along angle surfaces 20h as previously described until a portion of the cassette contacts the first stopping member 26 when the first stopping member 26 is in its first orientation. After the cassette 24 contacts the first stopping member 26, responsive to impact forces, the first stopping member 26 may move in direction X1 away from the cart 20 until the first stopping member 26 reaches its second position. Examples of the first stopping member 26 in the second position are shown in FIGS. 3-4A.

The first stopping member 26 may be rotatably and translatably coupled to the frame 20a using a bolt 29 or other mechanism extending through the mounting block 27 and permitting movement of the first stopping member 26 in directions X1 and X2 (opposite X1), along a rotational axis R1 of the first stopping member 26 with respect to the frame 20a. A spring member 43 may be operably coupled to the first stopping member 26 so as to provide a force on the first stopping member 26 biasing the first stopping member in a direction X2 from the first stopping member second position toward the first stopping member first position (i.e., in a direction X2 opposite direction X1). The spring member may extend between an end 29a of the bolt 29 and mounting block second side 27b.

The first stopping member 26 may be coupled to the frame 20a so as to be movable in the direction X1 away from the frame 20a against the biasing force exerted by the spring member 43, and responsive to impact on the first stopping member 26 by the cassette moving in direction X1. In one or more arrangements, the spring member 43 may be structured to compress a certain amount responsive to the force of the cassette 24 on the first stopping member 26, and then exert a return force on the stopping member 26 in direction X2, thereby forcing the cassette 24 in direction X2.

In addition, an anti-rotation element 31 may be coupled to the frame 20a. In the embodiment shown, the anti-rotation element 31 is attached to the cross-member 20c adjacent the first stopping member 26. The anti-rotation element 31 may be structured to permit rotation of the first stopping member 26 from the first stopping member first orientation to the first stopping member second orientation when the first stopping member 26 is in its first position. The anti-rotation element 31 may also be structured to prevent rotation of the first stopping member 26 from the first stopping member first orientation to the first stopping member second orientation when the first stopping member 26 is in its second position.

Referring to FIGS. 3 and 4, in one or more particular arrangements, the anti-rotation element 31 may have a base portion 31a and a flange portion 31b extending from the base portion. Also, the first stopping member 26 may have an anti-rotation element abutment surface 26f structured to contact the anti-rotation element flange portion 31b if the first stopping member 26 rotates (FIG. 4) from its first orientation toward its second orientation while the first stopping member 26 is in the second position. The anti-rotation element 31 may be structured so that all portions of the anti-rotation element 31 reside below the level of the base 24e of the cassette 24 so that only the first and second stopping members 26, 40 interfere with movement of the cassette 24 onto and off the cart 20.

Referring to the drawings, a second stopping member 40 may also be coupled to the frame 20a so as to be rotatable with respect to the frame to at least a second stopping member first orientation (shown in FIGS. 1-3) and a second stopping member second orientation (shown in FIGS. 6 and 7). As seen in FIGS. 1-3, the second stopping member 40 may be structured to be positioned in the path of movement of the cassette 24 in the first direction X1 so as to prevent the cassette 24 from separating from the support surfaces 20h when the second stopping member 40 is in the second stopping member first orientation. Also, as seen in FIGS. 6 and 7, the second stopping member 40 may be structured to be positioned out of the path of movement of the cassette 24 in the first direction X1 so as to enable the cassette 24 to separate from the support surface 20h when the second stopping member 40 is in the second stopping member second orientation.

As described herein, the first stopping member 26 may be structured to contact the second stopping member 40 during rotation of the first stopping member 26 from the first stopping member first orientation to the first stopping member second orientation, to rotate the second stopping member 40 from the second stopping member first orientation to the second stopping member second orientation.

The second stopping member first and second orientations may be angular or rotational orientations of the second stopping member 40 with respect to the plane P1. In the embodiment shown, the second stopping member 40 is rotatably mounted to a second stopping member mounting block 41 attached to the cross member 20c. Use of the mounting block 41 enables the second stopping member 40 to be mounted at a height that will enable the second stopping member 40 to be rotated to the second stopping member first orientation to stop motion of the cassette 24 off the cart 20, while also enabling the second stopping member 40 to be rotated to the second stopping member second orientation to allow motion of the cassette 24 off the cart 20, as described herein. The mounting block 41 may be structured so that all portions of the mounting block reside below the level of the base 24e of the cassette 24 so that only the first and second stopping members 26, 40 interfere with movement of the cassette 24 onto and off the cart 20.

In one or more arrangements, the second stopping member 40 may also be movable with respect to the frame 20a between a first position (FIGS. 1-2) and a second position (FIGS. 3-4) spaced farther apart from the frame 20a than the first position, as described previously with respect to first stopping member 26. The second stopping member 40 may reside in the first position prior to contact with a moving cassette 24, and may move to the second position responsive to contact with the second stopping member 40 by the cassette 24. In one or more arrangements, the second stopping member 40 may be spring-loaded as described with respect to the first stopping member 26. That is, a spring (not shown) may exert a biasing force on second stopping member 40 acting in direction X2 and may be compressed by contact of cassette 23 with second stopping member 40, thereafter exerting a return force on cassette 24. Alternatively, the spring member 43 acting on first stopping member 26 alone may exert a sufficient return force to push the cassette back in direction X2.

Operation of the wheeled transport cart 20 will now be discussed with reference to FIGS. 1-7.

In FIGS. 1A and 1B, first and second stopping members 26, 40 are in their first positions and cassette 24 is approaching the first and second stopping members 26, 40 in direction X1.

In FIG. 2, cassette 24 makes contact with first stopping member 26. Following contact with cassette 24, first stopping member 26 may move in direction X1 from its first position to its second position (FIG. 3). While first stopping member 26 is in its second position, any rotation of the first stopping member 26 toward the anti-rotation element 31 will cause anti-rotation element abutment surface 26f to contact anti-rotation element flange portion 31b (FIGS. 4, 4A), thereby stopping further rotation of the first stopping member 26. As a result, the first stopping member 26 will still be positioned in a movement path of the cassette 24 and the cassette 24 will be prevented from rolling off the support surfaces 20h. Thus, the spring-loaded first stopping member 26 absorbs the contact force exerted by the cassette 24 and the anti-rotation element 31 prevents undesirable rotation of the first stopping member 26 to its second orientation, which would allow the cassette 24 to fall off the cart 20.

Referring to FIGS. 5-7, when it is desired to allow the cassette 24 to roll off the cart 20, first stopping member 26 may be rotated (manually or automatically) in a direction toward the anti-rotation element 31 while the first stopping member 26 is in its first position. The anti-rotation element 31 is structured to not interfere with rotation of the first stopping member 26 when the first stopping member 26 is in the first position. Therefore, the first stopping member 26 may rotate until it is out of the movement path of the cassette (FIGS. 6, 6A). The rotating first stopping member 26 also contacts and rotates the second stopping member 40 in the same rotational direction, thereby removing the second stopping member 40 from the movement path of the cassette 24. This allows the cassette 24 to continue moving in direction X1 off of the cart (FIG. 7).

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A transport cart comprising:
   a frame defining at least one support surface structured to support a cassette positioned on the cart;
   a first stopping member coupled to the frame so as to be rotatable with respect to the frame along a rotational axis of the first stopping member to at least a first stopping member first orientation and a first stopping member second orientation, the first stopping member also being structured to be movable with respect to the frame along the rotational axis between a first position and a second position spaced farther apart from the frame than the first position; and an anti-rotation element coupled to the frame, the anti-rotation element being structured to permit rotation of the first stopping member from the first stopping member first orientation to the first stopping member second orientation when the first stopping member is in the first position, the anti-rotation element also being structured to prevent rotation of the first stopping member from the first stopping member first orientation to the first stopping member second orientation when the first stopping member is in the second position.

2. The transport cart of claim 1 wherein the first stopping member is structured to be positioned in a path of movement of the cassette in a first direction when the first stopping member is in the first stopping member first orientation, so as to prevent the cassette from separating from the at least one support surface.

3. The transport cart of claim 1 wherein the first stopping member is structured to be positioned out of a path of movement of the cassette in a first direction when the first stopping member is in the first stopping member second orientation, so as to enable the cassette to separate from the at least one support surface when the first stopping member is in the first stopping member second orientation.

4. The transport cart of claim 1 further comprising a second stopping member coupled to the frame so as to be rotatable independently of the first stopping member with respect to the frame to at least a second stopping member first orientation and a second stopping member second orientation, wherein the first stopping member is structured to contact the second stopping member during rotation of the first stopping member from the first stopping member first orientation to the first stopping member second orientation, to rotate the second stopping member from the second stopping member first orientation to the second stopping member second orientation.

5. The transport cart of claim 4 wherein the second stopping member is structured to be positioned in a path of movement of the cassette in a first direction when the second stopping member is in the second stopping member first orientation so as to prevent the cassette from separating from the at least one support surface.

6. The transport cart of claim 4 wherein the second stopping member is structured to be positioned out of a path of movement of the cassette in a first direction when the second stopping member is in the second stopping member second orientation so as to enable the cassette to separate from the at least one support surface when the second stopping member is in the second stopping member second orientation.

7. The transport cart of claim 4 wherein the second stopping member is structured to be movable with respect to the frame along a rotational axis of the second stopping member between a first position and a second position spaced farther apart from the frame than the first position.

8. The transport cart of claim 1 further comprising a spring member operably coupled to the first stopping member so as to provide a biasing force on the first stopping member biasing the first stopping member in a direction from the second position toward the first position.

9. The transport cart of claim 8 wherein the first stopping member is coupled to the frame so as to be movable in a direction away from the frame against the biasing force exerted by the spring member.

10. The transport cart of claim 1 wherein the first stopping member is structured to be movable with respect to the frame between the first position and the second position responsive to contact of the cassette with the first stopping member.

11. The transport cart of claim 1 wherein the first stopping member is structured to be movable along an axis of rotation of the first stopping member.

* * * * *